United States Patent
Murray

(10) Patent No.: US 7,022,764 B2
(45) Date of Patent: Apr. 4, 2006

(54) STATIC DISSIPATING RESIN COMPOSITION AND METHODS FOR MANUFACTURE THEREOF

(75) Inventor: Michael C. Murray, Downingtown, PA (US)

(73) Assignee: General Electric Company, Pittsfield, MA (US)

( * ) Notice: Subject to any disclaimer, the term of this patent is extended or adjusted under 35 U.S.C. 154(b) by 31 days.

(21) Appl. No.: 10/691,686

(22) Filed: Oct. 23, 2003

(65) Prior Publication Data

US 2004/0122168 A1    Jun. 24, 2004

Related U.S. Application Data

(60) Provisional application No. 60/434,855, filed on Dec. 18, 2002.

(51) Int. Cl.
*C08L 69/00* (2006.01)
*C08L 67/02* (2006.01)

(52) U.S. Cl. .......................... 525/66; 525/67; 525/425; 525/439

(58) Field of Classification Search ................. 525/66, 525/67, 425, 439
See application file for complete search history.

(56) References Cited

U.S. PATENT DOCUMENTS

| | | | |
|---|---|---|---|
| 2,465,319 A | 3/1949 | Whinfield | |
| 2,675,390 A | 4/1954 | Rosenblatt | |
| 2,888,484 A | 5/1959 | Dehm et al. | |
| 2,999,835 A | 9/1961 | Goldberg | |
| 3,028,365 A | 6/1962 | Peterson | |
| 3,047,539 A | 7/1962 | Pengilly | |
| 3,153,008 A | 10/1964 | Fox | |
| 3,334,154 A | 8/1967 | Kim | |
| 3,444,237 A | 5/1969 | Jaffe | |
| 3,635,895 A | 1/1972 | Kramer | |
| 4,001,184 A | 1/1977 | Scott | |
| 4,123,436 A | 10/1978 | Holub et al. | |
| 4,131,575 A | 12/1978 | Adelmann et al. | |
| 4,217,438 A | 8/1980 | Brunelle et al. | |
| 4,754,064 A | 6/1988 | Lillwitz | |
| 5,441,997 A | 8/1995 | Walsh et al. | |
| 5,574,104 A | 11/1996 | Kolycheck et al. | |
| 5,604,284 A * | 2/1997 | Ueda et al. | 524/434 |
| 5,849,822 A * | 12/1998 | Kido et al. | 524/159 |
| 6,706,851 B1 * | 3/2004 | Linemann et al. | 528/271 |

FOREIGN PATENT DOCUMENTS

| | | |
|---|---|---|
| EP | 0924259 | 6/1999 |
| JP | 08245869 | 9/1996 |
| WO | WO-99/63002 | * 12/1999 |
| WO | WO 02/32999 | 4/2002 |
| WO | WO 02/38675 | 5/2002 |

* cited by examiner

*Primary Examiner*—David J. Buttner

(57) ABSTRACT

A substantially transparent antistatic, impact resistant, molding composition comprises a miscible mixture of a polycarbonate resin and a cycloaliphatic polyester resin, and an antistatic polymeric material wherein the mixture of the polycarbonate and the cycloaliphatic polyester resin is present in suitable proportions for substantially matching the index of refraction of the antistatic polymeric material.

13 Claims, No Drawings

STATIC DISSIPATING RESIN COMPOSITION AND METHODS FOR MANUFACTURE THEREOF

CROSS REFERENCE TO RELATED APPLICATIONS

This application claims priority to U.S. Provisional Application Ser. No. 60/434,855 filed on Dec. 18, 2002, which is incorporated herein by reference in its entirety.

FIELD OF INVENTION

This invention relates to thermoplastic permanent electrostatic dissipating compositions having substantial transparency.

BACKGROUND OF INVENTION

This disclosure relates to permanent electrostatic dissipating compositions having excellent transparency and impact resistances. Polymeric resins are suitable for a large number of applications because of their high strength-to-weight ratio and ease of processing. Polymeric resins, however, are insulating in nature and are therefore electrostatic charges can build on plastic when subjected to frictional forces such as rubbing. Their inability to dissipate such electrostatic charges leads them to attract dust and foreign particles, thereby spoiling the appearance of molded parts made therefrom. Additionally, the build up of electrostatic charges renders the polymeric resin unusable in certain electrical and electronic applications. It is therefore desirable to have polymeric resins that possess antistatic properties (i.e., are electrostatically conductive) and that maintain these properties at the elevated temperatures used in processing these materials.

Polymeric resins and articles having antistatic properties are typically obtained by directly blending antistatic agents with the polymeric resins during a compounding process. Unfortunately, the antistatic agent often migrates to the surface layer of the article over time, lowering the antistatic properties due to frictional wear of the surface layer. A need therefore remains for stable antistatic compositions wherein the antistatic agent remains well dispersed in the bulk of the polymeric resin during high temperature processing and subsequent use. In addition, it is desirable to have such antistatic compositions transparent for use in electronic packaging where it is important to be able to see the part when packaged.

SUMMARY OF INVENTION

Antistatic compositions comprising polymeric resins and a static dissipating resin are often opaque which is undesirable especially in electronic packaging applications. In particular it is very difficult to add a static dissipating polymer to polycarbonate resins to achieve a transparent product.

According to an embodiment, a substantially transparent antistatic, impact resistant, molding composition comprises a major portion by weight percent of a miscible mixture of a polycarbonate resin and a cycloaliphatic polyester resin, and an antistatic polymeric material wherein the mixture of the polycarbonate and the cycloaliphatic polyester resin is present in suitable proportions for substantially matching the index of refraction of the antistatic polymeric material. According to another embodiment, the composition may include additional miscible resins provided the additional miscible resins together with the polycarbonate and polyester resins form a mixture which substantially matches the index of refraction of the antistatic polymeric material. According to an embodiment, additional ingredients in the form of immiscible resins present in the molding composition desirable have an index of refraction substantially matching the index of refraction of the antistatic polymeric material. Owing to its excellent antistatic, impact and transparent properties, the compositions may utilize for electrical and electronic equipment, electronic packaging and applications requiring anti-dust properties.

DETAILED DESCRIPTION OF PREFERRED EMBODIMENTS

According to an embodiment, the addition of a cycloaliphatic resin (preferable poly(cyclohexane-1,4-dimethylene cylohexane-1,4 dicarboxylate) hereinafter PCCD) of various viscosities of about MV2000 to about 6000 poise in combination with a particular polymeric static dissipative material having an index of refraction of about 1.52 to about 1.44 (RI), preferable a polyetheresteramide, and an aromatic polycarbonate resin having a weight average molecular weight of about 22000 to about 30000 produces a clear, antistatic compositions with high impact properties. The cycloaliphatic polyester resin desirable has an index of refraction less than the index of refraction of the polymeric antistatic material and the polycarbonate desirable has an index of refraction greater than the index of refraction of the antistatic material. The proportions of cycloaliphatic polyesterresin and polycarbonate resin are selected so that the resulting index of refraction of the miscible mixture substantially matches the index of refraction of the antistatic polymeric material. Preferably the refractive index of the miscible mixture is within about 0.005, and even more preferably, within 0.003 units of the polymeric antistatic material utilized.

The term aromatic polycarbonate resin, comprises aromatic carbonate chain units and includes compositions having structural units of the formula (I):

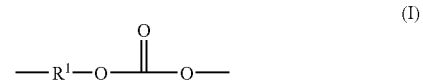

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

wherein each of $A^1$ and $A^2$ is a monocyclic, divalent aryl radical and $Y^1$ is a bridging radical having one or two atoms which separate $A^1$ from $A^2$. In an exemplary embodiment, one such atom separates $A^1$ from $A^2$. Illustrative non-limiting examples of $Y^1$ are —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene.

Polycarbonate resins can be produced by the reaction of the carbonate precursor with dihydroxy compounds. As used herein, the term "dihydroxy compound" includes, for example, bisphenol compounds having general formula (III) as follows:

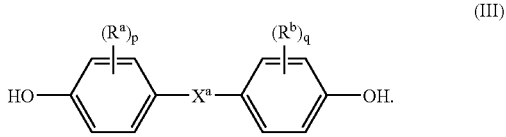

wherein $R^a$ and $R^b$ each represent a halogen atom, for example chlorine or bromine, or a monovalent hydrocarbon group, preferably having from 1 to 10 carbon atoms, and may be the same or different; p and q are each independently integers from 0 to 4; Preferably, $X^a$ represents one of the groups of formula (IV):

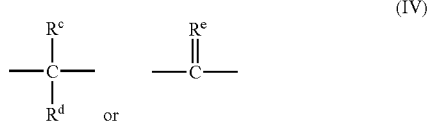

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted aromatic hydrocarbons disclosed in U.S. Pat. No. 4,217,438, which is incorporated herein by reference. A nonexclusive list of specific examples of the types of bisphenol compounds that may be represented by formula (III) includes 1,1-bis(4-hydroxyphenyl)methane; 1,1-bis(4-hydroxyphenyl) ethane; 2,2-bis(4-hydroxyphenyl)propane (hereinafter "bisphenol A" or "BPA"); 2,2-bis(4-hydroxyphenyl)butane; 2,2-bis(4-hydroxyphenyl)octane; 1,1-bis(4-hydroxyphenyl) propane; 1,1-bis(4-hydroxyphenyl) n-butane; bis(4-hydroxyphenyl) phenylmethane; 2,2-bis(4-hydroxy-1-methylphenyl)propane; 1,1-bis(4-hydroxy-t-butylphenyl) propane; bis(hydroxyaryl)alkanes such as 2,2-bis(4-hydroxy-3-bromophenyl)propane; 1,1-bis(4-hydroxyphenyl) cyclopentane; and bis(hydroxyaryl) cycloalkanes such as 1,1-bis(4-hydroxyphenyl)cyclohexane. Two or more different dihydric phenols may also be used.

Typical carbonate precursors include the carbonyl halides, for example carbonyl chloride (phosgene), and carbonyl bromide; the bis-haloformates, for example the bis-haloformates of dihydric phenols such as bisphenol A, hydroquinone, and the like, and the bis-haloformates of glycols such as ethylene glycol and neopentyl glycol; and the diaryl carbonates, such as diphenyl carbonate, di(tolyl)carbonate, and di(naphthyl)carbonate.

The term "antistatic electrostatic dissipating polymer" (hereinafter antistatic polymer) refers to several materials that can be either melt-processed into polymeric resins or sprayed onto commercially available polymeric forms and shapes to improve conductive properties and overall physical performance. Typical, monomeric antistatic agents are glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, quaternary ammonium salts, quaternary ammonium resins, imidazoline derivatives, sorbitan esters, ethanolamides, betaines and mixtures of the foregoing.

Typical polymeric antistatic polymers are: copolyesteramides, polyether-polyamides, polyetheramide block copolymers, polyetheresteramide block copolymers, polyurethanes containing a polyalkylene glycol moiety, polyetheresters and mixtures thereof. Polymeric antistatic materials are desirable since they are typically fairly thermally stable and processable in the melt state in their neat form or in blends with other polymeric resins. The polyetheramides, polyetheresters and polyetheresteramides include block copolymers and grail copolymers both of which are obtained by the reaction between a polyamide-forming compound and/or a polyester-forming compound, and a compound containing a polyalkylene oxide unit. Polyamide forming compounds include aminocarboxylic acids such as ω-aminocaproic acid, ω-aminoenanthic acid, ω-aminocaplylic acid, ω-aminopelargonic acid, ω-aminocapric acid, 1,1-aminoundecanoic acid and 1,2-aminododecanoic acid; lactams such as ε-caprolactam and enanthlactam; a salt of a diamine with a dicarboxylic acid, such as hexamethylene diamine adipate, hexamethylene diamine sebacate, and hexamethylene diamine isophthalate; and a mixture of these polyamide-forming compounds. A desirable polyamide-forming compounds are caprolactam, 1,2-aminododecanoic acid, or a combination of hexamethylene diamine and adipate.

The preferred antistatic materials are polymeric antistatic agents. The antistatic polymers are generally used in amounts about 0.015 to about 25 wt %, preferably about 5 to about 20 wt %, and more preferably about 5 to about 10 wt % of the total composition. Commercially available antistatic materials include Pelestat NC7530 (polyetheresteramide) from Sanyo Chemical) having an RI of about 1.531, IRGASTAT P16, available from CIBA SPECIALTY CHEMICALS, manufactured by Atofina (Pebax MV1074) RI=1.508), Pelestat NC6321 (Sanyo Chemical sold in the Americas by Tomen, RI=1.51); Pelestat 6500 with the same refractive index as Pelestat NC6321, a small molecule with salt or electrolyte added to it to increase its conductivity.

The cycloaliphatic polyesters are condensation products of aliphatic diacids, or chemical equivalents and aliphatic diols, or chemical equivalents. The present cycloaliphatic polyesters may be formed from mixtures of aliphatic diacids and aliphatic diols but must contain at least 50 mole % of cyclic diacid and/or cyclic diol components, the remainder, if any, being linear aliphatic diacids and/or diols. The cyclic components are necessary to impart good rigidity to the polyester and to allow the formation of transparent blends due to favorable interaction with the polycarbonate resin. On a weight basis, the cycloalphatic poly is preferably at least 8 weight % of a cycloalphatic diol and/or a cycloalphatic dicarbonxylic acid or chemical equivalent thereof with the remainder, if any, being linear aliphatic diol and/or linear aliphatic diacid or equivalents thereof.

The preferred cycloaliphatic radical in the cycloaliphatic polyester resin is derived from the 1,4-cyclohexyl diacids and most preferably greater than 70 mole % thereof in the form of the trans isomer. The preferred cycloaliphatic radical R is derived from the 1,4-cyclohexyl primary diols such as 14-cyclohexyl dimethanol, most preferably more than 70 mole % thereof in the form of the trans isomer.

Other diols useful in the preparation of the cycloaliphatic polyester resins of the present invention are cycloaliphatic alkane diols and may contain from 2 to 12 carbon atoms. Examples of such diols include but are not limited to ethylene glycol; propylene glycol, i.e., 1,2- and 1,3-propylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; 2,2,4,4-tetramethyl-1,3-cyclobutanediol (TMCBD), triethylene glycol; 1,10-decane diol; and mixtures of any of the foregoing. Preferably a cycloaliphatic diol or chemical equivalent thereof and particularly 1,4-cyclohexane dimethanol or its chemical equivalents are used as the diol component.

Chemical equivalents to the diols include esters, such as dialkylesters, diaryl esters and the like.

The diacids useful in the preparation of the aliphatic polyester resins preferably are cycloaliphatic diacids. This is meant to include carboxylic acids having two carboxyl groups each of which is attached to a saturated carbon. Preferred diacids are cyclo or bicyclo aliphatic acids, for example, decahydro naphthalene dicarboxylic acids, norbornene dicarboxylic acids, bicyclo octane dicarboxylic acids, 1,4-cyclohexanedicarboxylic acid or chemical equivalents, and most preferred is trans-1,4-cyclohexanedicarboxylic acid or chemical equivalent. Linear dicarboxylic acids like adipic acid, azelaic acid, dicarboxyl dodecanoic acid and succinic acid may also be useful.

Cyclohexane dicarboxylic acids and their chemical equivalents can be prepared, for example, by the hydrogenation of cycloaromatic diacids and corresponding derivatives such as isophthalic acid, terephthalic acid or naphthalenic acid in a suitable solvent such as water or acetic acid using a suitable catalysts such as rhodium supported on a carrier such as carbon or alumina. See, Friefelder et al., Journal of Organic Chemistry, 31, 3438 (1966); U.S. Pat. Nos. 2,675,390 and 4,754,064. They may also be prepared by the use of an inert liquid medium in which a phthalic acid is at least partially soluble under reaction conditions and with a catalyst of palladium or ruthenium on carbon or silica. See, U.S. Pat. Nos. 2,888,484 and 3,444,237.

Typically, in the hydrogenation, two isomers are obtained in which the carboxylic acid groups are in cis- or transpositions. The cis- and trans-isomers can be separated by crystallization with or without a solvent, for example, n-heptane, or by distillation. The cis-isomer tends to blend better; however, the trans-isomer has higher melting and crystallization temperatures and may be preferred. Mixtures of the cis- and trans-isomers are useful herein as well.

When the mixture of isomers or more than one diacid or diol is used, a copolyester or a mixture of two polyesters may be used as the present cycloaliphatic polyester resin.

Chemical equivalents of these diacids include esters, alkyl esters, e.g., dialkyl esters, diaryl esters, anhydrides, salts, acid chlorides, acid bromides, and the like. The preferred chemical equivalents comprise the dialkyl esters of the cycloaliphatic diacids, and the most favored chemical equivalent comprises the dimethyl ester of the acid, particularly dimethyl-1,4-cyclohexane-dicarboxylate.

A preferred cycloaliphatic polyester is poly(cyclohexane-1,4-dimethylene cyclohexane-1,4-dicarboxylate) also referred to as poly(1,4-cyclohexane-dimethanol-1,4-dicarboxylate) (PCCD) which has recurring units of formula II:

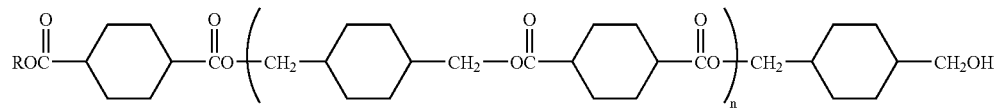

The polyester polymerization reaction is generally run in the melt in the presence of a suitable catalyst such as a tetrakis(2-ethyl hexyl) titanate, in a suitable amount, typically about 50 to 200 ppm of titanium based upon the final product.

The preferred aliphatic polyesters used in the present transparent molding compositions have a glass transition temperature (Tg) which is above 50° C., more preferably above 80° C. and most preferably above about 100° C.

Also contemplated herein are the above polyesters with from about 1 to about 50 percent by weight, of units derived from polymeric aliphatic acids and/or polymeric aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

Polycarbonates useful in the invention comprise the divalent residue of dihydric phenols, Ar', bonded through a carbonate linkage and are preferably represented by the general formula:

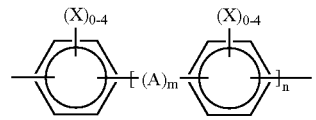

wherein A is a divalent hydrocarbon radical containing from 1 to about 15 carbon atoms or a substituted divalent hydrocarbon radical containing from 1 to about 15 carbon atoms; each X is independently selected from the group consisting of hydrogen, halogen, and a monovalent hydrocarbon radical such as an alkyl group of from 1 to about 8 carbon atoms, an aryl group of from 6 to about 18 carbon atoms, an arylalkyl group of from 7 to about 14 carbon atoms, an alkoxy group of from 1 to about 8 carbon atoms; and m is 0 or 1 and n is an integer of from 0 to about 5. Ar' may be a single aromatic ring like hydroquinone or resorcinol, or a multiple aromatic ring like biphenol or bisphenol A.

The dihydric phenols employed are known, and the reactive groups are thought to be the phenolic hydroxyl groups. Typical of some of the dihydric phenols employed are bis-phenols such as bis(4-hydroxyphenyl)methane, 2,2-bis (4-hydroxyphenyl)propane (also known as bisphenol-A), 2,2-bis(4-hydroxy-3,5-dibromo-phenyl)propane; dihydric phenol ethers such as bis(4-hydroxyphenyl)ether, bis(3,5-dichloro-4-hydroxyphenyl)ether; p,p'-dihydroxydiphenyl and 3,3'-dichloro-4,4'-dihydroxydiphenyl; dihydroxyaryl sulfones such as bis(4-hydroxyphenyl)sulfone, bis(3,5-dimethyl-4-hydroxyphenyl)sulfone, dihydroxy benzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl)sulfide, bis(4-hydroxy-phenyl)sulfoxide and bis(3,5-dibromo-4-hydroxyphenyl)sulfoxide. A variety of additional dihydric phenols are available and are disclosed in U.S. Pat. Nos. 2,999,835, 3,028,365 and 3,153,008; all of which are incorporated herein by reference. It is, of course, possible to employ two or more different dihydric phenols or a combination of a dihydric phenol with a glycol.

The carbonate precursors are typically a carbonyl halide, a diarylcarbonate, or a bishaloformate. The carbonyl halides include, for example, carbonyl bromide, carbonyl chloride, and mixtures thereof. The bishaloformates include the bishaloformates of dihydric phenols such as bischloroformates of 2,2-bis(4-hydroxyphenyl)-propane, hydroquinone, and the like, or bishaloformates of glycol, and the like. While all of the above carbonate precursors are useful, carbonyl chloride, also known as phosgene, and diphenyl carbonate are preferred.

The aromatic polycarbonates can be manufactured by any processes such as by reacting a dihydric phenol with a carbonate precursor, such as phosgene, a haloformate or carbonate ester in melt or solution U.S. Pat. No. 4,123,436 describes reaction with phosgene and U.S. Pat. No. 3,153,008 describes a transesterification process.

Preferred polycarbonates will be made of dihydric phenols that result in resins having low birefringence for example dihydric phenols having pendant aryl or cup shaped aryl groups like
  Phenyl-di(4-hydroxyphenyl)ethane (acetophenone bisphenol):
  Diphenyl-di(4-hydroxyphenyl)methane (benzophenone bisphenol):
  2,2-bis(3-phenyl-4-hydroxyphenyl)propane
  2,2-bis-(3,5-diphenyl-4-hydroxyphenyl)propane;
  bis-(2-phenyl-3-methyl-4-hydroxyphenyl)propane;
  2,2'-bis(hydroxyphenyl)fluorene;
  1,1-bis(5-phenyl-4-hydroxyphenyl)cyclohexane;
  3,3'-diphenyl-4,4'-dihydroxy diphenyl ether;
  2,2-bis(4-hydroxyphenyl)-4,4-diphenyl butane;
  1,1-bis(4-hydroxyphenyl)-2-phenyl ethane;
  2,2-bis(3-methyl-4-hydroxyphenyl)-1-phenyl propane;
  6,6'-dihyroxy-3,3,3',3'-tetramethyl-1,1'-spiro(bis)indane;

Other dihydric phenols which are typically used in the preparation of the polycarbonates are disclosed in U.S. Pat. Nos. 2,999,835, 3,028,365, 3,334,154 and 4,131,575. Branched polycarbonates are also useful, such as those described in U.S. Pat. Nos. 3,635,895 and 4,001,184. Polycarbonate blends include blends of linear polycarbonate and branched polycarbonate.

It is also possible to employ two or more different dihydric phenols or a copolymer of a dihydric phenol with an aliphatic dicarboxylic acids like; dimer acids, dodecane dicarboxylic acid, adipic acid, azelaic acid in the event a carbonate copolymer or interpolymer rather than a homopolymer is desired for use in the preparation of the polycarbonate mixtures of the invention. Most preferred are aliphatic C5 to C12 diacid copolymers.

The preferred polycarbonates are preferably high molecular weight aromatic carbonate polymers have an intrinsic viscosity (as measured in methylene chloride at 25° C.) ranging from about 0.30 to about 1.00 dl/gm. Polycarbonates may be branched or unbranched and generally will have a weight average molecular weight of from about 10,000 to about 100,000, preferably from about 20,000 to about 50,000 as measured by gel permeation chromatography. It is contemplated that the polycarbonate may have various known end groups.

Optionally an impact modifier may be employed in the practice of the instant invention. If the impact modifier is immiscible with the polycarbonate/cycloaliphatic polyester miscible mixture, the impact modifier desirable has an index of refraction that matches the index of refraction of the antistatic polymeric material. A substantially amorphous impact modifier copolymer resin may be added to the present composition in an amount between about 1 and 30% by weight and may comprise one of several different rubbery modifiers such as graft or core shell rubbers or combinations of two or more of these modifiers. Suitable are the groups of modifiers known as acrylic rubbers, ASA rubbers, diene rubbers, organosiloxane rubbers, EPDM rubbers, SBS or SEBS rubbers, ABS rubbers, MBS rubbers and glycidyl ester impact modifiers.

The term acrylic rubber modifier can refer to multi-stage, core-shell, interpolymer modifiers having a cross-linked or partially crosslinked (meth)acrylate rubbery core phase, preferably butyl acrylate. Associated with this cross-linked acrylic ester core is an outer shell of an acrylic or styrenic resin, preferably methyl methacrylate or styrene, which interpenetrates the rubbery core phase. Incorporation of small amounts of other monomers such as acrylonitrile or (meth)acrylonitrile within the resin shell also provides suitable impact modifiers. The interpenetrating network is provided when the monomers forming the resin phase are polymerized and cross-linked in the presence of the previously polymerized and cross-linked (meth)acrylate rubbery phase.

Preferred rubbers are graft or core shell structures with a rubbery component with a Tg below 0° C., preferably between about −40° to −80° C., composed of poly alkylacrylates or polyolefins grafted with PMMA or SAN. Preferably the rubber content is at least 40 wt %, most preferably between about 60–90 wt %.

Typical commercially available rubbers are the butadiene core-shell polymers of the type available from Rohm & Haas, for example Paraloid® EXL2600. typically, the impact modifier will comprise a two stage polymer having an butadiene based rubbery core and a second stage polymerized from methylmethacrylate alone or in combination with styrene. Other typical rubbers are the ABS types Blendex® 336 and 415, available form GE Specialty Chemicals. Desirable, the rubber utilized, if immiscible has a matching index of refraction which matches the index of refraction of the antistatic polymeric material, or, if miscible with the polycarbonate/cycloaliphatic polyester blend, is used in the appropriate proportion so that the resulting mixture has an index of refraction substantially matching the index of refraction of the polymeric antistatic material.

The impact modifier, if employed, should have an index of refraction (RI) essentially the same as the RI of the antistatic polymer. It should also be compatible with the other ingredients.

The preferred polycarbonate, cycloaliphatic polyester compositions of the present invention comprise
  (A) from 20 to 80% by weight of a blend of polycarbonate and cyclo aliphatic polyester resin, providing that the ratio of cyclo aliphatic polyester resin (PCCD) to polycarbonate resin is from about 1.0 to about 2 and preferable from about 1.6 to about 1.9 wherein the cyclo aliphatic polyester comprises the reaction product of (a) at least one cycloaliphatic $C_2$–$C_{12}$ alkane diol, most preferably a $C_6$–$C_{12}$ cycloaliphatic diol, or chemical equivalent thereof; and (b) at least one cycloaliphatic diacid, most preferably a $C_6$–$C_{12}$ diacid, or chemical equivalent thereof.

(B) from 0.01 to about 25 weight % preferably from about 5 to about 20 weight % and more preferably from about 5 to 10 weight 5 of a static dissipating polymer, and optionally;

(C) from 1 to 30%, preferably from 5 to 20% by weight of an impact modifier comprising a substantially amorphous.

The method of blending the compositions can be carried out by conventional techniques. Preferable the polyester and polycarbonate are pre-blended in an amount selected to match the refractive index of the static dissipating polymer. The ingredients are typically in powder or granular form, extruding the blend and comminuting into pellets or other suitable shapes for molding. The ingredients are combined in any usual manner, e.g., by dry mixing or by mixing in the melted state in an extruder, or in other blending processes.

In the thermoplastic compositions which contain a cycloaliphatic polyester resin and a polycarbonate resin it is preferable to use a stabilizer or quencher material. Catalyst quenchers are agents which inhibit activity of any catalysts which may be present in the resins. Catalyst quenchers are described in detail in U.S. Pat. No. 5,441,997. It is desirable to select the correct quencher to avoid color formation and loss of clarity to the composition herein described.

A preferred class of stabilizers including quenchers are those which provide a transparent and colorless product. Typically, such stabilizers are used at a level of 0.001 to about 10 weight percent and preferably at a level of from 0.005 to about 2 weight percent. The favored stabilizers include an effective amount of an acidic phosphate salt; an acid, alkyl, aryl or mixed phosphate having at least one acidic hydrogen; a Group IB or Group IIB metal phosphate salt; a phosphorus oxo acid, a metal acid pyrophosphate or a mixture thereof. The suitability of a particular compound for use as a stabilizer and the determination of how much is to be used as a stabilizer may be readily determined by preparing a mixture of the polyester resin component and the polycarbonate and determining the effect on melt viscosity, gas generation or color stability or the formation of interpolymer. The acidic phosphate salts include sodium dihydrogen phosphate, mono zinc phosphate, potassium hydrogen phosphate, calcium dihydrogen phosphate and the like.

The phosphate salts of a Group IB or Group IIB metal include zinc phosphate and the like. The phosphorus oxo acids include phosphorous acid, phosphoric acid, polyphosphoric acid or hypophosphorous acid.

The most preferred quenchers are oxo acids of phosphorus or acidic organo phosphorus compounds. Inorganic acidic phosphorus compounds may also be used as quenchers, however they may result in haze or loss of clarity. Most preferred quenchers are phosphoric acid, phosphorous acid or their partial esters.

EXAMPLES

The following examples serve to illustrate the invention but are not intended to limit the scope of the invention. Blends were prepared by dry blending the appropriate quantities in a Henschel high speed mixer. The dry blends were extruded in a 30 mm Werner and Pfleiderer Twin Screw extruder. A strand of static dissipating polymer and a polycarbonate composition containing PCCD as set forth in the Tables. The antistatic dissipating polymer employed in the Example was a polyetheresteramide (Pelestat NC7530 from Sanyo Chemical) having an RI of about 1.531. A standard stabilizing amount of 0.07 and 0.1 respectively, of monozinc phosphate and phosphorous acid ester was added to the blends of this example. A strand of clear antistatic containing thermoplastic resin composition emerging from the extruder was cooled in a water bath, pelletized, dried and injection molded on an 85 ton Van Dorn molding machine to obtain test samples.

Samples were tested for flexural strength and flexural modulus as per ASTM D790, tensile strength and elongation as per ASTM D638, notched izod as per ASTM D256. Heat distortion temperature (HDT) was performed on 0.5"×0.125"×5" bar at 264 pounds per square inch (psi) load at 248° F. 1 hour finishing at 554° F. as per ASTM D648. Haze was measured via a Color-Edge 7000 Series instrument. The refractive index (RI) of the blends in the following examples were calculated to be ~1.535 (PC~1.58, PCCD~1.506 and Pelestat NC7530 again having an RI~1.531). The ratio of PCCD/PC in Table 1 was 1.8 to 1. The results are as follows:

TABLE 1

Examples

| Experiment | Anti Static Resin/% | Haze/% | Notched Izod/ft lb/" of notch | FM × $10^3$/psi | HDT/° F. |
|---|---|---|---|---|---|
| 1 | 5 | 6.25 | 21.6 | 244.4 | 160 |
| 2 | 10 | 6.58 | 14.1 | 225.8 | 158 |
| 3 | 15 | 7.87 | 19.1 | 204.4 | 153 |

The blends produced transparent and colorless parts.

The following Table 2 shows properties of blends when the PCCD/PC ratio is the range as shown in the Table 2 below

TABLE 2

Comparative Examples

| Experiment | % PCCD | % PC | Ratio PCCD/PC | % Antistatic resin | % Haze | Notched Izod ft lb/" of notch | FM × 10 | HTD° F. |
|---|---|---|---|---|---|---|---|---|
| C4 | 75 | 15 | 5 | 0 | 5.1 | 21.2 | 210.0 | 139 |
| C5 | 75 | 15 | 5 | 10 | 78 | 17.9 | 188.9 | 139 |
| C6 | 65 | 13 | | | | | | |
| C7 | 67 | 13 | 5 | 20 | 97 | 16 | | 134 |
| C8 | 14 | 71 | 5 | 15 | 92 | 21.9 | 169.8 | 136 |
| C9 | 65 | 25 | 2.6 | 10 | 45 | 21.0 | 203.6 | 143 |

As shown from the above Table 2, without the antistatic dissipating polymeric resin, Experiment C4 the % haze is quite low (5.1%). However, the composition does not have static electricity dissipating properties. Also note that, even with a ratio of 2.6 PCCD/PC, the haze % is extremely high compared to PCCD/PC blend ratio in the 1.8 to 1.0 ratio. Preferable the PCCD/PC ratio is less than about 2, more preferable from about 2 to about 1.6, and more preferable from about 1.9 to about 1.7. Also the heat distortion, HDT, is significantly lower than the compositions of the invention, Experiment 1–3 of Table 1. The above preferred ratios are also desirable for reduced heat distortion.

While the invention has been described with reference to a preferred embodiment, it will be understood by those skilled in the art that various changes maybe made and equivalents may be substituted for elements thereof without departing from the scope of the inventor. In addition, many modifications may be made to adapt a particular situation or material to the teachings of this invention without departing from the scope hereof. Therefore, it is extended that the invention not be limited to the particular embodiment disclosed as the best mode contemplated for carrying out this invention, but that this invention will include all embodiments falling within the scope of the appended claims.

What is claimed:

1. A transparent permanent electrostatic dissipating composition comprising in combination;
   a transparent aromatic polycarbonate resin,
   a miscible transparent cycloaliphatic copolyester, and
   a sufficient amount of polyetheresteramide polymer for imparting electrostatic dissipative properties to said composition, said aromatic polycarbonate, said cycloaliphatic copolyester, and said polyetheresteramide polymer, each having a predetermined index of refraction wherein said index of refraction of said polyetheresteramide polymer has a refractive index value between said polycarbonate resin and said cycloaliphatic copolyester resin, said polycarbonate resin and said cycloaliphatic copolyester resin are present in said electrostatic composition for substantially matching the index of refraction of said polyetheresteramide polymer, said cycloaliphatic copolyester comprises the reaction product selected from the group consisting of:
   (1) at least 80 weight % of cycloaliphatic diol with the remainder, if any, being a linear aliphatic diol, or a combination of a linear aliphatic diol and a linear aliphatic diacid, or chemical equivalents of the above,
   (2) at least 80 weight % of a cycloaliphatic dicarboxylic acid with the remainder, if any, being a linear aliphatic diacid, or a combination of a linear aliphatic diacid and a linear aliphatic diol or chemical equivalents of above, and
   (3) a mixture of at least 80 weight % of a cycloaliphatic diol and at least 80 weight % of a cycloaliphatic dicarboxylic acid with the remainder, if any, being a linear aliphatic diol or a linear aliphatic diacid or a mixture of the two, or chemical equivalents of the above; and wherein the weight ratio of cycloaliphatic copolyester to polycarbonate is from about 2.0 to about 1.6.

2. The composition of claim 1 wherein the polyetheresteramide polymer is present in an amount of from 0.01 to about 25 weight % of the total weight of the composition.

3. The composition of claim 2 wherein the polyetheresteramide polymer is present in an amount of 5 to 15 weight %.

4. The composition of claim 1 wherein the cycloaliphatic diol is prepared from cycloaliphatic alkane diols of 2 to 12 carbon atoms.

5. The composition of claim 4 wherein the cycloaliphatic alkane diol is a 1,4-cyclohexyl primary diol.

6. The composition of claim 1 wherein the cycloaliphatic dicarboxylic acid is prepared from dicarboxylic acids having at least two carboxyl groups each of which is attached to a saturated carbon.

7. The composition of claim 6 wherein the cycloaliphatic dicarboxylic acid is selected from the group consisting of cyclo and bicyclo aliphatic acids selected from the group consisting of decahydronaphthalene dicarboxylic acids, norbornene dicarboxylic acids, bicyclo octane dicarboxylic acids, 1,4-cyclohexanedicarboxylic, and chemical equivalents thereof.

8. The composition of claim 1 wherein the cycloaliphatic copolyester is poly (1,4-cyclohexane-dimethanol-1,4-dicarboxylate).

9. The composition of claim 1 further comprising copolyesteramides, polyether-polyamides, polyetheramide block copolymers, polyetherester-amide block copolymers, polyurethane containing a polyalkylene glycol moiety, polyetheresters, and mixtures thereof.

10. The composition of claim 1 wherein the composition has in addition thereto an impact modifier wherein the impact modifier has a refractive index similar to the refractive index of the composition of claim 1.

11. The composition of claim 10 wherein the impact modifier is a rubbery modifier.

12. The impact modifier of claim 11 wherein the impact modifier is a core-shell modifier having at least a partially cross-linked (meth)acrylate rubber core phase and an outer shall comprising an acrylic resin.

13. The compositions of claim 1 wherein the refractive index of the composition is 1.52 to 1.54.

* * * * *